United States Patent
Zhao et al.

(10) Patent No.: US 11,292,876 B2
(45) Date of Patent: Apr. 5, 2022

(54) TETRAHYDROFURFURYL ALCOHOL INITIALIZED POLYETHERAMINES AND USES THEREOF

(71) Applicant: Huntsman Petrochemical LLC, The Woodlands, TX (US)

(72) Inventors: Haibo Zhao, The Woodlands, TX (US); Xiaohua Fang, The Woodlands, TX (US)

(73) Assignee: HUNTSMAN Petrochemical LLC, The Woodlands, TX (US)

( * ) Notice: Subject to any disclaimer, the term of this patent is extended or adjusted under 35 U.S.C. 154(b) by 311 days.

(21) Appl. No.: 16/612,451

(22) PCT Filed: Jun. 7, 2018

(86) PCT No.: PCT/US2018/036381
§ 371 (c)(1),
(2) Date: Nov. 11, 2019

(87) PCT Pub. No.: WO2019/005447
PCT Pub. Date: Jan. 3, 2019

(65) Prior Publication Data
US 2021/0284796 A1  Sep. 16, 2021

Related U.S. Application Data

(60) Provisional application No. 62/525,854, filed on Jun. 28, 2017.

(51) Int. Cl.
| | |
|---|---|
| *C08G 65/325* | (2006.01) |
| *C08F 212/08* | (2006.01) |
| *C08F 222/06* | (2006.01) |
| *C08F 283/06* | (2006.01) |
| *C08G 65/331* | (2006.01) |

(52) U.S. Cl.
CPC ........ *C08G 65/3255* (2013.01); *C08F 212/08* (2013.01); *C08F 222/06* (2013.01); *C08F 283/06* (2013.01); *C08G 65/3318* (2013.01); *C08G 2150/00* (2013.01); *C08G 2650/50* (2013.01)

(58) Field of Classification Search
CPC ...... C08L 2205/05; C08L 63/00; C08L 63/04; C08L 63/06; C08L 63/08; C08L 63/10; C08L 71/00; C08L 71/02; C08L 71/03; C08L 71/08; C08L 71/14; C08G 2650/50; C08G 2150/00; C08G 2150/20; C08G 2150/50; C08G 2150/60; C08G 2150/90; C08G 65/331; C08G 65/3311; C08G 65/3312; C08G 65/3314; C08G 65/3315; C08G 65/3317; C08G 65/3318; C08G 65/34; C08G 65/36; C08G 65/325; C08G 65/3255; C08G 65/26; C08G 65/2603; C08G 65/2609; C08G 65/2612; C08G 65/2615; C08G 65/2618; C08G 65/2621; C08G 65/2624; C08G 65/2627; C08G 65/263; C08G 65/2633; C08G 59/00; C08G 59/02; C08G 59/022; C08G 59/025; C08G 59/027; C08G 59/04; C08G 59/10; C08G 59/12; C08F 283/00; C08F 283/06; C08F 283/065
See application file for complete search history.

(56) References Cited

U.S. PATENT DOCUMENTS

| | | | | |
|---|---|---|---|---|
| 2,602,059 | A * | 7/1952 | De Groote | C10G 33/04 516/156 |
| 2,723,294 | A * | 11/1955 | Benoit | C08G 18/10 568/606 |
| 3,152,998 | A | 10/1964 | Moss | |
| 3,347,926 | A | 10/1967 | Zech | |
| 3,654,370 | A * | 4/1972 | Yeakey | C08L 2666/22 564/480 |
| 4,152,353 | A | 5/1979 | Habermann | |
| 4,766,245 | A | 8/1988 | Larkin et al. | |
| 5,840,106 | A | 11/1998 | Krepski | |
| 6,340,465 | B1 | 1/2002 | Hsu | |
| 6,426,414 | B1 * | 7/2002 | Laas | C08G 18/222 252/182.2 |
| 9,670,335 | B2 | 6/2017 | Kavanagh et al. | |
| 2010/0028582 | A1 * | 2/2010 | Joch | C08L 67/00 428/36.91 |
| 2018/0023020 | A1 * | 1/2018 | Zhao | C08G 81/025 508/288 |

FOREIGN PATENT DOCUMENTS

| | | |
|---|---|---|
| WO | 2015028193 | 3/2015 |
| WO | 2015144497 | 10/2015 |
| WO | 2016140998 | 9/2016 |
| WO | WO-2016140998 A1 * | 9/2016 .......... C10M 105/00 |

OTHER PUBLICATIONS

International Search Report and Written Opinion received in corresponding PCT Application PCT/US2018/036381 dated Aug. 10, 2018.

* cited by examiner

*Primary Examiner* — Christopher M Rodd
(74) *Attorney, Agent, or Firm* — Huntsman Petrochemical LLC; Aleece M. Hayes

(57) ABSTRACT

The present disclosure provides a non-hydrocarbyl-based alcohol initiated polyetheramine. In particular, the polyetheramine of the present disclosure is produced from a tetrahydrofurfuryl alcohol-based initiator which is alkoxylated and then reductively aminated. The polyetheramine of the present disclosure may be used in a variety of applications, such as a raw material in the synthesis of a dispersant for use in an aqueous pigment dispersion.

20 Claims, No Drawings

TETRAHYDROFURFURYL ALCOHOL INITIALIZED POLYETHERAMINES AND USES THEREOF

CROSS-REFERENCE TO RELATED APPLICATIONS

This application is the National Phase of International Application PCT/US2018/036381 filed Jun. 7, 2018 which designated the U.S. and which claims priority to U.S. Provisional App. Ser. No. 62/525,854 filed Jun. 28, 2017. The noted applications are incorporated herein by reference.

STATEMENT REGARDING FEDERALLY SPONSORED RESEARCH OR DEVELOPMENT

Not applicable.

FIELD

The present disclosure provides a tetrahydrofurfuryl-based alcohol initialized polyetheramine and its use in various applications, including, but not limited to, as a dispersant for pigments.

BACKGROUND

Polyetheramines are compounds containing at least one polyalkylene glycol group and at least one amine group. The manufacture of these materials is well known and generally includes the reaction of a hydrocarbyl group-containing alcohol initiator with an alkylene oxide to form an intermediate polyol, which in turn, is reductively aminated to form the polyetheramine. More specific processes can be found in, for example:

U.S. Pat. No. 3,347,926 which discloses polyetheramines produced from the alkoxylation of aliphatic monohydric initiator alcohols and their subsequent conversion into polyetheramines with ammonia and hydrogen in the presence of a catalyst;

U.S. Pat. No. 3,654,370 which describes polyetheramines prepared by the addition of ethylene oxide, propylene oxide or mixtures thereof to ethylene glycol, propylene glycol, glycerin or trimethylolpropane to form intermediates and their subsequent treatment with ammonia and hydrogen over a catalyst;

U.S. Pat. No. 4,766,245 which describes a process of making polyetheramines by the reductive amination of hydroxyl-terminated polyoxyalkylene compounds in the presence of a Raney nickel/aluminum catalyst; and more recently, WO 2015/028193 and WO 2015/144497 which disclose polyetheramines produced from glycerol, trimethylolpropane and 1,2-dialcohol initiators.

In spite of the above, there is a need to develop a new, versatile polyetheramine produced from a non-hydrocarbyl-based alcohol initiator which can replace state of the art polyetheramines and provide similar or improved performance during use in various applications.

SUMMARY

The present disclosure describes a polyetheramine having a formula (I)

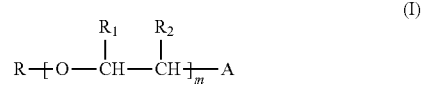

where R is a tetrahydrofurfuryl group or an alky-substituted tetrahydrofurfuryl group; $R_1$ and $R_2$ are each independently hydrogen, methyl or ethyl and each $R_1$ and $R_2$ is independently selected in each —O—$CHR_1$—$CHR_2$— unit; A is $NH_2$ or an N-alkyl amino having 1 to about 20 carbon atoms in the alkyl group; and, m is an integer ranging from about 2 to about 200.

DETAILED DESCRIPTION

The present disclosure provides a non-hydrocarbyl-based alcohol initialized polyetheramine. In particular, the present disclosure provides a tetrahydrofurfuryl-based alcohol initialized polyetheramine and its use in various applications. It has been surprisingly found that the tetrahydrofurfuryl-based alcohol initialized polyetheramine of the present disclosure can provide at least equal to, or in some aspects, improved performance as compared to hydrocarbyl alcohol initialized polyetheramines. Without being bound by theory, it is believed that the internal ether linkage in the 5-membered ring of the tetrahydrofurfuryl-based alcohol initiator can allow the subsequently produced polyetheramine to exhibit more hydrophilicity (i.e. the ether linkage in the 5-membered tetrahydrofurfuryl ring can form hydrogen bonds with water) than state of the art hydrocarbyl alcohol initialized polyetheramines. Thus, the inventive polyetheramines are expected to exhibit at least as good, if not improved, dispersing capabilities as compared to those for state of the art polyetheramines.

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The terms "or" and "and/or", unless stated otherwise, refer to the listed members individually as well as in any combination. For example, the expression A and/or B refers to A alone, B alone, or to both A and B.

The articles "a" and "an" are used herein to refer to one or to more than one (i.e. to at least one) of the grammatical objects of the article. By way of example, "an amine" means one amine or more than one amine. The phrases "in one aspect", "according to one aspect" and the like generally mean the particular feature, structure, or characteristic following the phrase is included in at least one aspect of the present disclosure, and may be included in more than one aspect of the present disclosure. Importantly, such phrases do not necessarily refer to the same aspect. If the specification states a component or feature "may", "can", "could", or "might" be included or have a characteristic, that particular component or feature is not required to be included or have the characteristic.

The terms "preferred" and "preferably" refer to aspects that may afford certain benefits, under certain circumstances. However, other aspects may also be preferred, under the same or other circumstances. Furthermore, the recitation of one or more preferred aspects does not imply that other aspects are not useful, and is not intended to exclude other aspects from the scope of the present disclosure.

The term "alkyl" refers to a monovalent radical of an alkane. Suitable alkyl groups can have up to about 20 carbon atoms, or up to 16 carbon atoms, or up to 12 carbon atoms, or up to 10 carbon atoms, or up to 8 carbon atoms, or up to 6 carbon atoms, or up to 4 carbon atoms, or up to 3 carbon atoms. The alkyl groups can be linear, branched, cyclic, or a combination thereof.

The term "hydrocarbyl" refers to an organic radical primarily composed of carbon and hydrogen which may be aliphatic, alicyclic, aromatic or combinations thereof.

The term "tetrahydrofurfuryl group" refers to a 2-tetrahydrofurfuryl group

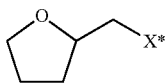

or to a 3-tetrahydrofurfuryl group

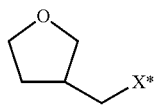

with the asterisk symbol denoting the attachment site of the tetrahydrofurfuryl group to the rest of the non-hydrocarbyl alcohol initialized polyetheramine compound (e.g. X*).

The term "alkyl-substituted tetrahydrofurfuryl group" refers to either a 2-tetrahydrofurfuryl group or 3-tetrahydrofurfuryl group that is substituted with at least one alkyl group. The number of alkyl substituents may be in the range of 1 to 3. In some aspects, the alkyl substituents for the tetrahydrofurfuryl group may have 1 to 10 carbon atoms, 1 to 6 carbon atoms, 1 to 4 carbon atoms, or 1 to 3 carbon atoms. The alkyl substituent can be positioned on any suitable carbon atom of the 5-membered ring but in some aspects may be at the 4-position or the 5-position. For example, in some aspects the alkyl substituent is methyl, such as a 5-methyl tetrahydrofurfuryl group.

The term "N-alkylamino" refers to the group —NHR$_a$, where R$_a$ is an alkyl group.

According to one aspect, the present disclosure provides a non-hydrocarbyl-based alcohol initialized polyetheramine. In particular, the present disclosure provides a tetrahydrofurfuryl-based alcohol initialized polyetheramine compound having the formula (I):

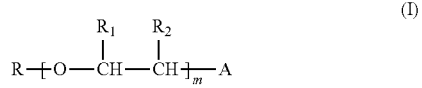

(I)

where R is a tetrahydrofurfuryl group or an alky-substituted tetrahydrofurfuryl group; R$_1$ and R$_2$ are each independently hydrogen, methyl or ethyl and each R$_1$ and R$_2$ is independently selected in each —O—CHR$_1$—CHR$_2$— unit; A is NH$_2$ or an N-alkyl amino having 1 to about 20 carbon atoms in the alkyl group; and, m is an integer ranging from about 2 to about 200. Thus, the above polyetheramine of formula (I) may include, without limitation, homopolymers, and both random and block polymers and co-polymers of any one or more of the following, either alone or mixed with one another in any proportion: oxyethylene, oxypropylene, and oxybutylene units.

In another aspect, the tetrahydrofurfuryl alcohol initialized polyetheramine is a compound having the formula (I), where R is a tetrahydrofurfuryl group; R$_1$ and R$_2$ are each independently hydrogen, methyl or ethyl and each R$_1$ and R$_2$ is independently selected in each —O—CHR$_1$—CHR$_2$— unit with the proviso that at least one of R$_1$ or R$_2$ is hydrogen; A is NH$_2$; and, m is an integer ranging from about 5 to about 100.

In still another aspect, the tetrahydrofurfuryl alcohol initialized polyetheramine is a compound having the formula (I), where R is a C$_1$-C$_4$ alkyl-substituted tetrahydrofurfuryl group; R$_1$ and R$_2$ are each independently hydrogen, methyl or ethyl and each R$_1$ and R$_2$ is independently selected in each —O—CHR$_1$—CHR$_2$— unit with the proviso that at least one of R$_1$ or R$_2$ is hydrogen; A is NH$_2$; and, m is an integer ranging from about 5 to about 100.

In yet another aspect, the molecular weight of the polyetheramine of formula (I) is between about 100 and about 12,000, or in other aspects between about 200 and about 5000, or in further aspects between about 500 and about 3000.

The tetrahydrofurfuryl alcohol initialized polyetheramine compound of formula (1) can be prepared by methods known to those skilled in the art. For example, it can be prepared utilizing tetrahydrofurfuryl alcohol or an alkyl-substituted tetrahydrofurfuryl alcohol as an initiator that is first charged to an alkoxylation reaction zone.

After charging, the initiator is contacted with an alkylene oxide in the alkoxylation reaction zone for a period of time sufficient to provide an intermediate polyol. The alkylene oxide may be ethylene oxide, propylene oxide and/or butylene oxide. In other aspects, the alkylene oxide may be ethylene oxide and/or propylene oxide.

The amount of alkylene oxide which is contacted with the initiator may range from about 1.2 to about 1.8 moles, and in some instances from about 1.4 to about 1.6 moles, of alkylene oxide per mole of initiator. Additionally, the period of time the initiator is contacted with the alkylene oxide is a period of time sufficient to form the intermediate polyol, and in some instances may range from about 0.5 hours to about 24 hours.

The alkoxylation reaction zone can be a closed reaction vessel with alkoxylation being carried out under elevated temperature and pressure and in the presence of a base catalyst. For example, alkoxylation may be conducted at a temperature ranging from about 50° C. to about 150° C. and at a pressure ranging from about 40 psi to about 100 psi. The base catalyst may be any alkaline compound customarily used for base-catalyzed reactions, for example, an alkali metal hydroxide such as sodium hydroxide, lithium hydroxide, potassium hydroxide, or cesium hydroxide, or a tertiary amine, such as dimethyl cyclohexylamine or 1,1,3,3-tetramethylguanidine. After alkoxylation, the resulting product may be vacuum stripped to remove any unnecessary components, such as excess unreacted alkylene oxide, water and/or base catalyst, while leaving the resulting intermediate polyol.

The intermediate polyol is then used as a feedstock in a reductive amination step. In some instances, prior to reductive amination, the intermediate polyol is neutralized with acid or chemical adsorbent, such as for example, oxalic acid or magnesium silicate, and filtered for the removal of insoluble materials. The intermediate polyol is charged to a reductive amination zone where it is brought into contact with a reductive amination catalyst, sometimes referred to as a hydrogenation-dehydrogenation catalyst, and reductively aminated in the presence of hydrogen and ammonia or a primary alkyl amine under reductive amination conditions. Reductive amination conditions may include, for example, a temperature within the range of about 150° C. to about 275° C. and a pressure within the range of about 500 psi to about 5000 psi or with a temperature within the range of about 180° C. to about 220° C. and pressure within the range of about 100 psi to about 2500 psi being used in some aspects.

In one aspect, the primary alkyl amine contains 1 nitrogen atom and from about 1 to about 20 carbon atoms, or from about 1 to about 6 carbon atoms, or even from about 1 to about 4 carbon atoms. Examples of primary alkyl amines include, but are not limited to, N-methylamine, N-ethylamine, N-propylamine, N-isopropylamine, N-butylamine, N-isobutylamine, N-sec-butylamine, N-tert-butylamine, N-pentylamine, N-cyclopentylamine, N-hexylamine, N-cyclohexylamine, N-octylamine, N-decylamine, N-dodecylamine, N-octadecylamine, N-benzylamine, N-(2-phenylethyl)amine, 2-aminoethanol, 3-amino-1-propanol, 2-(2-aminoethoxy)ethanol, N-(2-methoxyethyl)amine and N-(2-ethoxyethyl)amine and the like.

Any suitable hydrogenation catalyst may be used, such as those described in U.S. Pat. No. 3,654,370, the contents of which are incorporated herein by reference. In some aspects, the hydrogenation catalyst may comprise one or more of the metals of group VIIIB of the Periodic Table, such as iron, cobalt, nickel, ruthenium, rhodium, palladium, and platinum, mixed with one or more metals of group VIB of the Periodic Table such as chromium, molybdenum or tungsten. A promoter from group IB of the Periodic Table, such as copper, may also be included. As an example, a catalyst may be used comprising from about 60 mole percent to about 85 mole percent of nickel, about 14 mole percent to about 37 mole percent of copper and about 1 mole percent to about 5 mole percent of chromium (as chromia), such as a catalyst of the type disclosed in U.S. Pat. No. 3,152,998. As another example, a catalyst of the type disclosed in U.S. Pat. No. 4,014,933 may be used containing from about 70% by weight to about 95% by weight of a mixture of cobalt and nickel and from about 5% by weight to about 30% by weight of iron. As another example, a catalyst of the type disclosed in U.S. Pat. No. 4,152,353 may be used, comprising nickel, copper and a third component which may be iron, zinc, zirconium or a mixture thereof, for example, a catalyst containing from about 20% by weight to about 49% by weight of nickel, about 36% by weight to about 79% by weight of copper and about 1% by weight to about 15% by weight of iron, zinc, zirconium or a mixture thereof. As still another example, a catalyst of the type described in U.S. Pat. No. 4,766,245 may be used comprising about 60% by weight to about 75% by weight of nickel and about 25% by weight to about 40% by weight of aluminum.

The reductive amination may be conducted on a continuous basis with the intermediate polyol, ammonia or primary alkyl amine and hydrogen being continuously charged to a reactor containing a fixed bed of reductive amination catalyst and with product being continually withdrawn.

The product is suitably depressured so as to recover excess hydrogen and ammonia or primary alkyl amine for recycle and is then fractionated to remove by-product water of reaction to provide the inventive polyetheramine.

During reductive amination, the reductive amination conditions which may also be utilized include the use of from about 4 moles to about 150 moles of ammonia or primary amine per hydroxyl equivalent of intermediate polyol feedstock. Hydrogen may be used in an amount ranging from about 0.5 mole equivalents to about 10 mole equivalents of hydrogen per hydroxyl equivalent of intermediate polyol feedstock. The contact times within the reaction zone, when the reaction is conducted on a batch basis, may be within the range of from about 0.1 hours to about 6 hours or from about 0.15 hours to about 2 hours.

When the reaction is conducted on a continuous basis using catalyst pellets, reaction times may be from about 0.1 grams to about 2 grams of feedstock per hour per cubic centimeter of catalyst and, more preferably, from about 0.3 grams to about 1.6 grams of precursor feedstock per hour per cubic centimeter of catalyst. Also, the reductive amination may be conducted in the presence of about 1 mole to about 200 moles of ammonia or primary alkyl amine per mole of intermediate polyol or from about 4 moles to about 130 moles of ammonia or primary alkyl amine per mole of intermediate polyol. From about 0.1 moles to about 50 moles of hydrogen per mole of intermediate polyol may be employed or from about 1 mole to about 25 moles of hydrogen per mole of intermediate polyol.

The novel polyetheramines of formula (I) are useful in a variety applications, including, but not limited to, epoxy curing agents, wetting and dispersing agents for organic and inorganic pigments, dyestuffs, and color brighteners. Other applications include the use as cement additives and in oil & gas field applications, such as corrosion inhibitors, demulsifiers and acid retarding agents.

In one particular aspect, the polyetheramine of formula (I) is a dispersant which is capable of facilitating the formation of a variety of pigments to provide stable pigment dispersions in which the pigment is provided substantially at the primary particle size of the pigment with the highest pigment loading possible at a desired viscosity. In one particular aspect, the dispersant is a reaction product of the polyetheramine of formula (I) and a copolymer comprised of polymerized units of an alkenyl aromatic monomer and an α,β-unsaturated carboxylic acid moiety.

The alkenyl aromatic monomer may be any compound containing an ethylenically unsaturated functional group attached directly to an aromatic radical. Such compounds correspond to the general formula

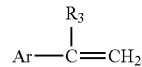

where Ar represents an aryl group such as phenyl or naphthyl and $R_3$ is hydrogen or methyl. The aryl group may be substituted with one or more substituents such as alkoxy, aryl, carboxy, hydroxy, nitro, cyano, halogen and alkyl. Illustrative alkenyl aromatic monomers which may be used for use in the copolymer include styrene, α-methyl styrene, aromatic substituted (ortho-, meta-, or para-) methyl styrene, ethyl styrene, isopropyl styrene, tert-butyl styrene, chlorostyrene, bromostyrene, vinyl naphthalene, acetoxystyrene, methoxystyrene, hydroxystyrene, cyanostyrene, vinyl xylene, nitrostyrene, benzyl styrene and mixtures thereof. In one aspect, the alkenyl aromatic monomer is styrene due to its low cost and high reactivity when copolymerized with α,β-unsaturated carboxylic acid moieties.

The α,β-unsaturated carboxylic acid moiety may be any ethylenically unsaturated organic compound which is copolymerizable with the alkenyl aromatic monomer and which contains a carboxylic functional group reactive with the amino group of the polyetheramine of formula (I). The carboxylic functional group may be an acid, ester, imide, or anhydride. The α,β-unsaturated carboxylic acid moiety is therefore most suitably either an α,β-unsaturated dicarboxylic acid anhydride, α,β-unsaturated dicarboxylic diacid, α,β-unsaturated monocarboxylic acid, α,β-unsaturated dicarboxylic acid ester (mono- or di-) and α,β-unsaturated dicarboxylic acid imide. Different types of carboxylic acid moieties may be present.

In one aspect, an α,β-unsaturated dicarboxylic acid anhydride is preferred since the anhydride functionality may be readily reacted with the polyetheramine of formula (I) to form amide linkages. Comonomers of this type have the following general structure prior to copolymerization:

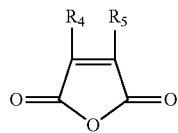

where $R_4$ and $R_5$ are the same or different and are independently selected from hydrogen, halogen, $C_1$-$C_{10}$ alkyl, aryl and arylalkyl. Examples of α,β-unsaturated dicarboxylic acid anhydrides include, but are not limited to, maleic anhydride, citraconic anhydride, ethyl maleic anhydride, methyl itaconic anhydride, dibromomaleic anhydride, itaconic anhydride, chloromaleic anhydrides, dichloromaleic anhydride, phenyl maleic anhydride, aconitic anhydride and mixtures thereof.

The α,β-unsaturated carboxylic acid moiety may alternatively be an α,β-unsaturated dicarboxylic diacid, diester, or half-acid, half-ester corresponding to the general structure:

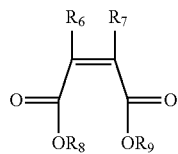

where $R_6$ and $R_7$ are the same or different and are independently selected from hydrogen, halogen, $C_1$-$C_{10}$ alkyl, aryl and arylalkyl, and $R_8$ and $R_9$ are the same or different and are independently selected from hydrogen, $C_1$-$C_{10}$ alkyl, aryl and arylalkyl. Examples of α,β-unsaturated dicarboxylic diacids include, but are not limited to, maleic acid, fumaric acid, itaconic acid, citraconic acid, mesaconic acid, ethyl maleic acid, methyl itaconic acid, chloromaleic acid, dichloromaleic acid, bromomaleic acid, dibromo maleic acid, phenylmaleic acid and mixtures thereof. Methyl, ethyl, propyl, butyl, benzyl, or phenyl mono- or diesters of these diacids may also be used.

In another embodiment, an α,β-unsaturated monocarboxylic acid or ester may be utilized which has the general structure:

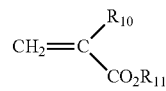

where $R_{10}$ and $R_{11}$ are the same or different and are independently selected from hydrogen, $C_1$-$C_{10}$ alkyl, aryl, and arylalkyl. Illustrative examples of comonomers of this type include but are not limited to, acrylic acid, methacrylic acid, methyl acrylate, methyl methacrylate, ethyl acrylate, ethyl methacrylate, butyl acrylate, 2-ethylhexyl acrylate and mixtures thereof.

The imide analogues of the α,β-unsaturated dicarboxylic acid anhydrides discussed hereinabove may also be employed as comonomers in the thermoplastic copolymer wherein the anhydride oxygen atom is replaced by $NR_{12}$. The $R_{12}$ group may be hydrogen, alkyl (for e.g., methyl, ethyl), arylalkyl (for e.g., benzyl, phenethyl) or aryl (for e.g., phenyl).

In one particular aspect, the copolymer is comprised of polymerized units of styrene and maleic anhydride.

In another aspect, the alkenyl aromatic monomer polymerized units comprise more than 50 mole percent of the copolymer with the α,β-unsaturated carboxylic acid moiety polymerized units comprising less than 50 mole percent of the copolymer. In yet another aspect, the copolymer is comprised of from at least 50 weight percent, or at least 60 weight percent, or at least 70 weight percent, or at least 80 weight percent, or at least 90 weight percent alkenyl aromatic monomer polymerized units, based on the total weight of the copolymer, and less than 50 weight percent, or less than 40 weight percent, or less than 30 weight percent or less than 20 weight percent or less than 10 weight percent α,β-unsaturated carboxylic acid moiety polymerized units, based on the total weight of the copolymer. In a still further aspect, the copolymer is comprised of from at least 70 weight percent to 97 weight percent alkenyl aromatic monomer polymerized units, based on the total weight of the copolymer, and from at least 3 weight percent to 30 weight percent α,β-unsaturated carboxylic acid moiety polymerized units, based on the total weight of the copolymer.

The polymerization may carried out by known batchwise or continuous polymerization methods, such as mass suspension, precipitation or solution polymerization and initiation with suitable free radical chain initiators, for example, hydroperoxides, peroxides or azo compounds, such as dilauroyl peroxide, dibenzoyl peroxide, tert-butyl perpivalate, tert-butyl permaleate, tert-butyl perbenzoate, dicumyl peroxide, tert-butyl cumyl peroxide, di-tert-butyl peroxide, cumyl hydroperoxide, tert-butyl hydroperoxide, 2.2'-azobis(Z-methylpropanonitrile), 2.2'-azobis(2-methylbutyronitrile) and mixtures thereof. In general, these initiators are used in amounts of from 0.1% to 20% by weight, or from 0.2% to 10% by weight, based on the total weight of the alkenyl aromatic monomer and α,β-unsaturated carboxylic acid moiety.

The polymerization may carried out as a rule at temperatures of about 40° C. to 400° C. or about 80° C. to 250° C., pressure expediently being used when α,β-unsaturated carboxylic acid moieties or solvents having boiling points below the polymerization temperature are used. The polymerization may be carried out in the absence of air, for example, under nitrogen, since oxygen interferes with the polymerization. In choosing the initiator or the initiator system, it is expedient to ensure that the half-life of the initiator or of the initiator system at the chosen polymerization temperature is less than 3 hours.

Apparatuses suitable for the polymerization are, for example, conventional stirred vessels having, for example, anchor stirrers, paddle stirrers, impeller stirrers or multistage impulse countercurrent agitators, and for the continuous preparation, stirred vessel cascades, tube reactors or static mixers.

In one aspect, the preferred process for the preparation of the copolymers is solution polymerization. It is carried out in solvents in which the alkenyl aromatic monomer and α,β-unsaturated carboxylic acid moiety and the resulting copolymer are soluble. Suitable solvents for this purpose are all those which meet these requirements and which do not react with the alkenyl aromatic monomer and α,β-unsaturated carboxylic acid moiety and with the resulting copolymer. These are, for example, organic, preferably aromatic and/or aliphatic, solvents such as cumene, toluene, xylene, ethylbenzene, decane, pentadecane or commercial solvent mixtures.

In the preparation, the alkenyl aromatic monomer and α,β-unsaturated carboxylic acid moiety may be initially introduced and may be polymerized by adding a free radical chain initiator and with the supply of heat.

After polymerization, the copolymer that is obtained is reacted with the polyetheramine of formula (I). The preparation of the reaction product of the copolymer and polyetheramine of formula (I) may be carried out at temperatures of from about 50° C. to about 250° C., or from about 60° C. to about 200° C. While amides are formed at temperatures below 100° C., imides can be formed at higher temperatures. In some aspects, the polyetheramine of formula (I) may be used in amounts of from about 0.001 mole to about 2 mole per mole of copolymer, or from about 0.01 mole to about 1 mole per mole of copolymer, or from about 0.5 mole to about 0.95 mole per mole of copolymer.

In one aspect, the copolymer is initially introduced and the polyetheramine of formula (I) is then subsequently metered in. However, it is also possible for all starting materials to be mixed at room temperature and caused to react by increasing the temperature. In addition, the components may be allowed to react in solution using an organic solvent or mixture of solvents capable of dissolving the components. Such organic solvents include, but are not limited to, ethers such as tetrahydrofuran, aromatic hydrocarbons, such as toluene, and halogenated hydrocarbons, such as methylene chloride.

In one aspect, when the α,β-unsaturated carboxylic acid moiety in the copolymer is an anhydride, the polyetheramine of formula (I) reacts to form a half-amide, half-acid which can possibly be converted to an imide by dehydration.

The reaction conditions will vary depending upon the reactivity of the individual components. For instance, when the copolymer contains anhydride groups, the reaction will generally take place rapidly at relatively low temperature since the anhydride ring is opened rather easily by the polyetheramine. If the copolymer contains acid, imide, or ester groups however, more vigorous reaction conditions may be necessary. The rate of reaction may be increased in such instances by the use of an appropriate catalyst, higher reaction temperatures or by removing any volatile coproducts which may be generated. Where the carboxylic group in the copolymer is a carboxylic acid, for example, it may be helpful to combine the components under vacuum in order to remove the water formed during reaction. Likewise, if the copolymer contains carboxylic ester groups, the rate of reaction can be improved by separating the alcohol coproduct that is formed.

In another aspect, the dispersant is a reaction product of the polyetheramine of formula (I) and an epoxy resin. In one aspect, the epoxy resin may have an average 1,2-epoxy functionality greater than 1, or at least about 1.4, and still at least about 2.

In one aspect, the epoxy resin has a 1,2-epoxy equivalency (functionality) on the average of at least 2 to 6.5 epoxide groups per molecule. The epoxy resin can be saturated or unsaturated, linear or branched, aliphatic, cycloaliphatic, aromatic or heterocyclic, and may bear substituents which do not materially interfere during the reaction with the polyetheramine of formula (I). Such substituents can include bromine or fluorine. The epoxy resin may be monomeric or polymeric, liquid or solid, for example, a low melting solid at room temperature. The epoxy resin may be a glycidyl ether prepared by reacting epichlorohydrin with a compound containing at least 1.5 aromatic hydroxyl groups, and carried out under alkaline reaction conditions. In other aspects, the epoxy resin may be a monoepoxide, a diglycidyl ether of a dihydric compound, an epoxy novolac or a cycloaliphatic epoxy. Generally the epoxy resin contains a distribution of compounds with a varying number of repeat units. Further, the epoxy resin can be a mixture of epoxy resins. For example, in one aspect, the epoxy resin can comprise a monoepoxide resin and di- and/or a multifunctional epoxy resin having functionalities from 2 to 6.5.

Examples of monoepoxides include, but are not limited to: the glycidyl ethers of phenol, t-butyl phenol, cresol, nonyl phenol, and aliphatic alcohols; and glycidated monoacids and epoxides formed from alpha-olefins and glycidoxyalkylalkoxyslianes.

Other examples of specific epoxy resins which may be used include, but are not limited to, those represented by the formulae:

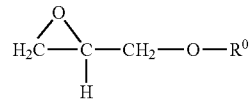

where $R^0$ is a linear or branched alkyl group;

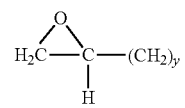

where y is an integer from 1 to 6;

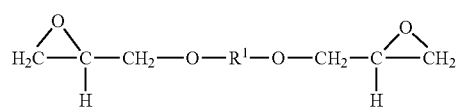

where $R^1$ is an alkyl group, an aryl, or an arylalkyl group;

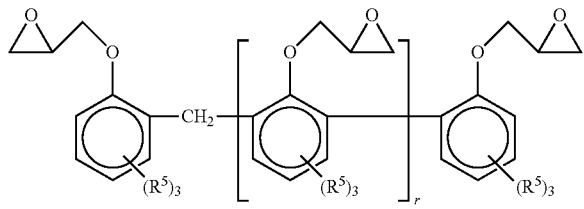

where $R^5$ is independently hydrogen or a $C_1$-$C_{10}$ alkyl group and r is an integer from 0 to 6;

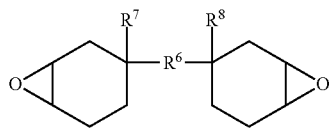

where $R^6$ is a $C_1$-$C_{20}$ alkyl group optionally containing ether or ester group(s) or together with $R^7$ and $R^8$ forms a spiro ring optionally containing heteroatoms, and $R^7$ and $R^8$ are independently hydrogen or together with $R^6$ forms a spiro ring optionally containing heteroatoms. In some aspects, $R^6$ is a divalent cycloaliphatic group having the formula

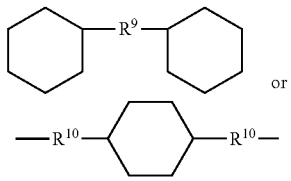

where $R^9$ and $R^{10}$ are each independently a $C_1$-$C_{20}$ alkyl group or an arylalkyl group having the formula

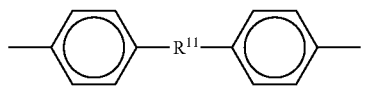

where $R^{11}$ is a $C_1$-$C_{20}$ alkyl group.

According to one aspect, the epoxy resin is a difunctional epoxy resin selected from a diglycidyl ether of a dihydric phenol, a diglycidyl ether of a hydrogenated dihydric phenol, an aliphatic glycidyl ether, an epoxy novolac and a cycloaliphatic epoxy.

Diglycidyl ethers of dihydric phenols can be produced, for example, by reacting a dihydric phenol and a suitably substituted epichlorohydrin under alkaline conditions, or in the presence of an acidic catalyst with subsequent alkali treatment. Examples of dihydric phenols include, but are not limited to: 2,2-bis(4-hydroxyphenyl) propane (bisphenol-A); 2,2-bis(4-hydroxy-3-tert-butylphenyl) propane; 1,1-bis (4-hydroxyphenyl)ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols also include advancement products of the above diglycidyl ethers of dihydric phenols with dihydric phenols such as bisphenol-A.

Diglycidyl ethers of hydrogenated dihydric phenols can be produced, for example, by hydrogenation of compounds having two free alcoholic hydroxy groups followed by a glycidation reaction with an epihalohydrin in the presence of a Lewis acid catalyst and subsequent formation of the glycidyl ether by reaction with sodium hydroxide. Examples of suitable dihydric phenols include those listed above.

Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. Examples of aliphatic glycidyl ethers include those corresponding to the formulas

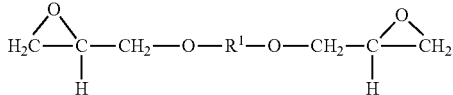

where $R^1$ is $(CH_2)_p$ or

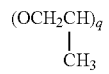

and p is an integer from 2 to 12, and in some aspects from 2 to 6; and q is an integer from 4 to 24, and in some aspects from 4 to 12.

Examples of aliphatic glycidyl ethers include, but are not limited to: diglycidyl ethers of 1,4 butanediol; neopentyl glycol; cyclohexanedimethanol; hexanediol; polypropylene glycol and like diols and glycols; and triglycidyl ethers of trimethylol ethane and trimethylol propane.

Epoxy novolacs can be produced by condensation of formaldehyde and a phenol followed by glycidation by reaction of an epihalohydrin in the presence of an alkali. The phenol can be for example, phenol, cresol, nonylphenol and t-butylphenol. Examples of the preferred epoxy novolacs include those corresponding to the formula

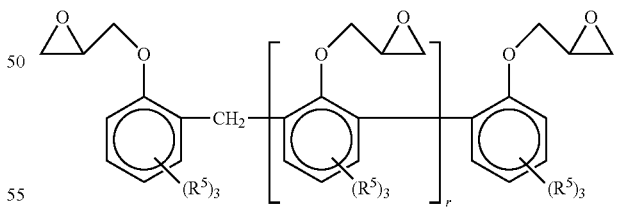

where $R^5$ is independently hydrogen or a $C_1$ to $C_{10}$ alkyl group and r is an integer from 0 to 6. Epoxy novolacs generally contain a distribution of compounds with a varying number of glycidated phenoxymethylene units, r. Generally, the quoted number of units is the number closest to the statistical average, and the peak of the distribution.

Cycloaliphatic epoxies can be produced by epoxidizing a cycloalkene-containing compound with greater than one olefinic bond with peracetic acid. Examples of cycloaliphatic epoxies include those corresponding to the formula

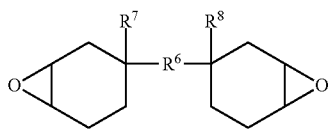

where $R^6$ is a $C_1$ to $C_{20}$ alkyl group optionally containing ether or ester group(s) or together with $R^7$ and $R^8$ form a spiro ring optionally containing heteroatoms, and $R^7$ and $R^8$ are independently hydrogen or together with $R^6$ form a spiro ring optionally containing heteroatoms; or

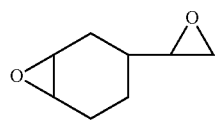

Examples of cycloaliphatic epoxies include, for example, 3,4-epoxycyclo-hexylmethyl-(3,4-epoxy)cyclohexane carboxylate, dicycloaliphatic diether diepoxy [2-(3,4-epoxy)cyclohexyl-5,5-spiro(3,4-epoxy)-cyclohexane-m-dioxane], bis (3,4-epoxy-cyclohexylmethyl)adipate, bis(3,4-epoxycyclohexyl)adipate and vinylcyclohexene dioxide [4-(1,2-epoxyethyl)-1,2-epoxycyclohexane]. Cycloaliphatic epoxies also include compounds of the formulas

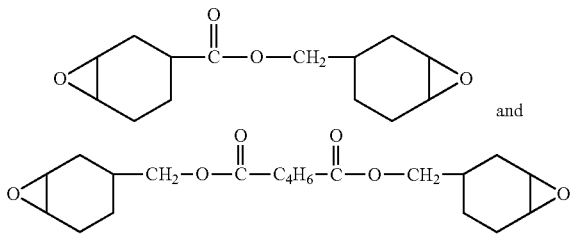

According to another aspect, the epoxy resin comprises a bisphenol based resin selected from the group of bisphenol A glycidyl ethers, bisphenol F glycidyl ethers, modified bisphenol A glycidyl ethers, modified bisphenol F glycidyl ethers and mixtures thereof.

As discussed above, the dispersant may be a reaction product of the polyetheramine of formula (I) and epoxy resin. It is easy for one of ordinary skill in the art to control the relative amounts of the raw materials used in forming the dispersant. For example, in one aspect, there is an excess of epoxy resin present, which results in dispersant molecules which are end-capped with epoxy groups. In another aspect, there is excess polyetheramine used in forming the dispersants, which results in dispersant molecules which are end-capped with amine groups.

In general, the dispersant can be obtained by reacting the epoxy resin with the polyetheramine of formula (I) in excess of epoxides based on equivalents, wherein from about 40% to less than about 90% of the epoxide groups of the starting material are reacted and the epoxy equivalent:amine equivalent ratio is between about 1.10:1 to about 5:1, or between about 1.1:1 to about 4:1, or between about 1.10:1 to about 3:1, or even between about 1.10:1 to about 2.5:1.

In one aspect, it may be preferred that the polyetheramine of formula (I) and epoxy resin are present in such amounts that the amine group of the polyetheramine is able to be consumed by reacting with essentially all of the epoxide functionality of the epoxy resin. Thus, during the reaction, the amount of polyetheramine of formula (I) is stoichiometrically equal to or greater than the amount of epoxide in the epoxy resin. The resulting product has little, if any, unreacted epoxide functionality left after the reaction.

The reaction may take place at a temperature in the range of 20° C. to 200° C., or in a range of 50° C. to 150° C. In addition, the reaction may be carried out in an inert atmosphere or air. If an inert atmosphere is used, the atmosphere may be nitrogen or argon. Furthermore, the reaction may optionally be carried out in the presence of a solvent. Typically no solvent is necessary, but if present, it may be water or an organic solvent disclosed herein. Finally, reaction times vary independently, and may be any time between about 0.5 hours and about 10 hours.

In one particular aspect, the dispersant is a reaction product of the polyetheramine amine of formula (I), where A is $NH_2$, and the epoxy resin is a compound having the formula

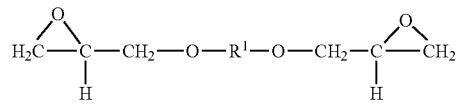

where $R^1$ is a $C_1$-$C_{20}$ alkyl group or an aromatic group optionally substituted by a $C_1$-$C_{20}$ alkyl group. Accordingly, the dispersant may have a structure having a formula:

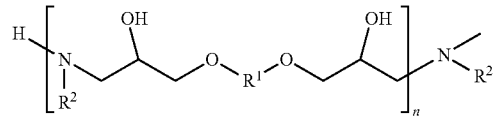

where $R^1$ is defined above; n is an integer from about 5 to about 100; and, $R^2$ has the formula:

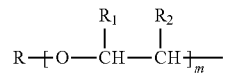

where R is a tetrahydrofurfuryl group or an alky-substituted tetrahydrofurfuryl group, preferably a tetrahydrofurfuryl group; $R_1$ and $R_2$ are each independently hydrogen, methyl or ethyl and each $R_1$ and $R_2$ is independently selected in each —O—$CHR_1$—$CHR_2$— unit; and, m is an integer ranging from about 2 to about 200.

According to another aspect, the dispersants described above, which are water soluble, are combined with water to form an aqueous solution. Thus, in some aspects, the dispersant is soluble in water to a degree of at least 5% by weight of the dispersant, or to a degree of at least 10% by weight of the dispersant, or to a degree of at least 15% by weight of the dispersant, or even to a degree of at least 20% by weight of the dispersant, based on the total weight of the aqueous solution. In still other aspects, the dispersant is soluble in water to a degree of at least 25% by weight of the dispersant, or to a degree of at least 30% by weight of the dispersant, or to a degree of at least 35% by weight of the dispersant, or even to a degree of at least 40% by weight of dispersant, based on the total weight of the aqueous solution.

In still further aspects, the dispersant is soluble in water to a degree of at least 45% by weight of the dispersant, or to a degree of at least 50% by weight of the dispersant, or to a degree of at least 55% by weight of the dispersant, or even to a degree of at least 60% by weight of dispersant, based on the total weight of the aqueous solution. In one particular aspect, the dispersant is miscible with water in all proportions.

In another aspect, the present disclosure provides an aqueous pigment dispersion comprising the dispersant described above, a pigment and a solvent component. The term "aqueous pigment dispersion" herein refers to an aqueous pigment dispersion in which a high concentration of a pigment has been dispersed in water, which serves as a dispersion medium, before production of ink.

The pigment used in the present disclosure is not particularly limited, and organic or inorganic pigments that can be generally used in aqueous pigment dispersions can be employed. Either untreated pigments or treated pigments can be used.

In particular, any known inorganic or organic pigment can be used. Examples of the inorganic pigment include iron oxide and carbon blacks produced by known methods, such as a contact method, a furnace method, and a thermal method. Examples of the organic pigment include azo pigments (including azolake, insoluble azo pigments, condensed azo pigments, and chelate azo pigments), polycyclic pigments (e.g., phthalocyanine pigments, perylene pigments, perinone pigments, anthraquinone pigments, quinacridone pigments, dioxazine pigments, thioindigo pigments, isoindolinone pigments, and quinophthalone pigments), dye chelates (e.g., basic dye chelates and acid dye chelates), nitro pigments, nitroso pigments, and aniline black.

Examples of pigments will now be described by color. Examples of pigments used in black inks include carbon blacks such as No. 2300, No. 2200B, No. 900, No. 960, No. 980, No. 33, No. 40, No. 45, No. 45L, No. 52, HCF88, MA7, MA8, and MA100 manufactured by Mitsubishi Chemical Corporation; Raven 5750, Raven 5250, Raven 5000, Raven 3500, Raven 1255, and Raven 700 manufactured by Columbian Chemicals Company; Regal 400R, Regal 330R, Regal 660R, Mogul L, Mogul 700, Monarch 800, Monarch 880, Monarch 900, Monarch 1000, Monarch 1100, Monarch 1300, and Monarch 1400 manufactured by Cabot Corporation; and Color Black FW1, FW2, FW2V, FW18, FW200, S150, S160, and S170, Printex 35, U, V, and 1400U, Special Black 6, 5, 4, and 4A, NIPEX 150, NIPEX 160, NIPEX 170, and NIPEX 180 manufactured by Degussa AG.

Specific examples of pigments used in yellow inks include C. I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, and 185.

Specific examples of pigments used in magenta inks include C. I. Pigment Red 5, 7, 12, 48(Ca), 48(Mn), 57(Ca), 57:1, 112, 122, 123, 146, 168, 176, 184, 185, 202, 209, and 269 and C. I. Pigment Violet 19.

Specific examples of pigments used in cyan inks include C. I. Pigment Blue 1, 2, 3, 15, 15:3, 15:4, 16, 22, 60, 63, and 66.

Specific examples of pigments used in white inks include sulfates and carbonates of alkaline earth metals, silicas, such as fine powder of silicic acid and synthesized silicate, calcium silicate, alumina, hydrated alumina, titanium oxide, zinc oxide, talc, and clay. These inorganic white pigments may be subjected to a surface treatment by a variety of surface-treating techniques.

The solvent component used in the present disclosure can be water or a mixture of water and a water-soluble organic solvent. The water used in the present disclosure serves as the dispersion medium of the pigment. Examples of usable water include, but are not limited to, pure water, such as ion exchanged water, ultra-filtrated water, reverse osmotic water, distilled water and ultra-pure water.

These types of water may be used alone or combined with a water-soluble solvent into a mixed solvent component. Examples thereof include a variety of organic solvents, for instance, ketones such as acetone, methyl ethyl ketone, methyl butyl ketone, and methyl isobutyl ketone; alcohols such as methanol, ethanol, 2-propanol, 2-methyl-1-propanol, 1-butanol, and 2-methoxyethanol; ethers such as tetrahydrofuran, 1,4-dioxane, and 1,2-dimethoxyethane; glycols such as dimethyl formamide, N-methyl pyrrolidone, ethylene glycol, diethylene glycol, triethylene glycol, tetraethylene glycol, propylene glycol, polyethylene glycol, and polypropylene glycol; diols such as butane diol, pentane diol, hexane diol, and homologous diols thereto; glycol esters such as propylene glycol laurate; glycol ethers such as ethers of diethylene glycol monoethyl, diethylene glycol monobutyl, and diethylene glycol monohexyl and cellosolve including a propylene glycol ether, a dipropylene glycol ether, and a triethylene glycol ether; alcohols such as methanol, ethanol, isopropyl alcohol, 1-propanol, 2-propanol, 1-butanol, 2-butanol, butyl alcohol, pentyl alcohol, and homologous alcohols thereto; sulfolanes; lactones such as gamma-butyrolactone; lactams such as N-(2-hydroxyethyl) pyrrolidone; and glycerin and derivatives thereof. These water-soluble organic solvents may be used alone or in combination.

The concentration of the dispersant in the aqueous pigment dispersion may be between about 0.1% by weight to about 40% by weight, based on the dry pigment weight. According to another aspect, the dispersant is present in the aqueous pigment dispersion in an amount of between about 0.5% by weight to about 25% by weight, based on the dry pigment weight. According to yet another aspect, the dispersant is present the aqueous pigment dispersion in an amount of between about 1% by weight to about 10% by weight, based on the dry pigment weight.

The concentration of the pigment in the aqueous pigment dispersion is normally adjusted to be from about 10% by weight to about 50% by weight, based on the total weight of the aqueous pigment dispersion. In the case where the aqueous pigment dispersion is used to produce ink, the ink can be produced merely by diluting the aqueous pigment dispersion through appropriate addition of water or an additive thereto so that the concentration of the pigment is adjusted to be from about 0.1% by weight to about 30% by weight on the basis of the intended use or physical properties of the ink.

Thus, in some aspects, the aqueous pigment dispersion of the present disclosure is diluted to adjust the concentration to a predetermined level and can be used in a variety of applications, for example, coating of automobiles and building materials; printing inks such as offset inks, gravure inks, flexographic inks, and silk screen inks; and aqueous ink-jet recording inks.

The amount of solvent component present in the aqueous pigment dispersion according to the present disclosure may be any amount in the range of between about 30% by weight to about 99.8% by weight, and in some aspects from about 50% by weight to about 95% by weight, or even still from about 70% by weight to about 90% by weight, based on total weight of the aqueous pigment dispersion. Selection of a particular aqueous pigment dispersion as being suitable for a given final-use ink depends on the requirements of the specific application, such as, but not limited to, desired surface tension and viscosity, the selected pigment, drying time of the ink, and type of paper onto which the ink will be printed, as is generally recognized or appreciated by those skilled in the art.

The aqueous pigment dispersion of the present disclosure may optionally include customary auxiliaries from the group consisting of humectants, fillers, flame retardants, preservatives, photoprotectants, surfactants, antioxidants, resins, defoamers and antistats, and preferably in the customary amounts of up to about 20% by weight, based on the total weight of the aqueous pigment dispersion.

In another aspect, there is provided a method for dispersing a pigment into an aqueous pigment dispersion including admixing the solvent component, a pigment, and about 0.1% by weight to about 40% by weight, based on dry pigment weight, of the dispersant of the present disclosure and subjecting the admixture to shear for a time sufficient to disperse the pigment. The time sufficient to disperse the pigment is typically dependent on the nature of the pigment and dispersant and the equipment which is used and will be determined by the skilled practitioner.

EXAMPLES

Example 1. Synthesis of Tetrahydrofurfuryl Alcohol Initialized Polyetheramine

In two separate synthesis procedures, 2 pounds of tetrahydrofurfuryl alcohol were mixed with 90 g KOH flake. After removing water from the mixtures at 120° C., 37.2 pounds ethylene oxide (EO) was added to the mixtures at 120° C. followed by 2.84 pounds of propylene oxide (PO). 763 grams of magnesol was used to remove potassium ion. The intermediate polyols were then reacted with ammonia and hydrogen on a fixed bed reactor with a metal catalyst. After stripping off the ammonia and water, the polyetheramine products that were produced each had a melting point of about 55° C. and an amine value of 0.383 meq/g and 0.480 meq/g respectively.

Example 2. Synthesis of a Dispersant 254 grams of the polyetheramine of Example 1 having an amine value of 0.383 meq/g was mixed with 56.05 grams of ARALDITE® GY6010 epoxy resin and the mixture was reacted at 135° C. for seven hours. The dispersant product was then solubilized with water to a degree of 40% by weight dispersant, based on the total weight of the dispersant and water.

Example 3. Synthesis of a Dispersant 368 grams of the polyetheramine of Example 1 having an amine value of 0.383 meq/g was mixed with 56.05 grams of ARALDITE® GY6010 epoxy resin and the mixture was reacted at 135° C. for seven hours. The dispersant product was then solubilized with water to a degree of 40% by weight dispersant, based on the total weight of the dispersant and water.

Example 4. Synthesis of a Dispersant 196 grams of the polyetheramine of Example 1 having an amine value of 0.480 meq/g was mixed with 56.05 grams of ARALDITE® GY6010 epoxy resin and the mixture was reacted at 135° C. for seven hours. The dispersant product was then solubilized with water to a degree of 40% by weight dispersant, based on the total weight of the dispersant and water.

Example 5. Synthesis of a Dispersant 294 grams of the polyetheramine of Example 1 having an amine value of 0.480 meq/g was mixed with 56.05 grams of ARALDITE® GY6010 epoxy resin and the mixture was reacted at 135° C. for seven hours. The dispersant product was then solubilized with water to a degree of 40% by weight dispersant, based on the total weight of the dispersant and water.

Example 6. Evaluation of Dispersants

| Dye/Dispersant | Color Strength (%) | Gloss | Rubout Stability |
|---|---|---|---|
| Evonik Color Black FW 171 | | | |
| State of the art dispersant* | 100 | 29.3 | 0.28 |
| Example 2 | 91 | 27.9 | 0.2 |
| Example 3 | 83.7 | 28.2 | 0.1 |
| Example 4 | 90.1 | 27.8 | 0.06 |
| Example 5 | 74.4 | 28.1 | 0.57 |
| BASF Heliogen Blue L7101 | | | |
| State of the art dispersant* | 100 | 31.2 | 0.49 |
| Example 2 | 97.7 | 30.1 | 0.08 |
| Example 3 | 106 | 30.6 | 0.32 |
| Example 4 | 97.2 | 31 | 0.67 |
| Example 5 | 106 | 30.5 | 0.59 |
| Clariant Hostaperm Blue BT-617-D | | | |
| State of the art dispersant* | 100 | 33.9 | 0.75 |
| Example 2 | 106.9 | 32.5 | 1.3 |
| Example 3 | 108.1 | 32.6 | 0.97 |
| Sunfast ® Green 7 Dye | | | |
| State of the art dispersant* | 100 | 31.5 | 0.31 |
| Example 2 | 106.1 | 33.7 | 0.62 |
| Example 3 | 109.8 | 31.8 | 1.59 |
| Sun Chemical Quindo Magenta 122 | | | |
| State of the art dispersant* | 100 | 29.2 | 0.42 |
| Example 2 | 101.3 | 32.9 | 0.4 |
| Example 3 | 105.5 | 32.3 | 0.68 |
| Clariant Hostaperm Violet BL 01 | | | |
| State of the art dispersant* | 100 | 26.7 | 0.46 |
| Example 2 | 80.6 | 26.1 | 0.14 |
| Example 3 | 94.2 | 27.8 | 0.63 |

*BYK 190 dispersant.

While the foregoing is directed to aspects of the present disclosure, other and further aspects of the disclosure may be devised without departing from the basic scope thereof, and the scope thereof is determined by the claims that follow.

The invention claimed is:

1. A polyetheramine having a formula (I)

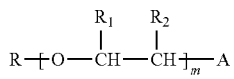

wherein R is a tetrahydrofurfuryl group or an alky-substituted tetrahydrofurfuryl group; $R_1$ and $R_2$ are each independently hydrogen, methyl or ethyl and each $R_1$ and $R_2$ is independently selected in each —O—$CHR_1$—$CHR_2$— unit; A is $NH_2$ or an N-alkyl amino having 1 to 20 carbon atoms in the alkyl group; and, m is an integer ranging from about 2 to about 200.

2. The polyetheramine of claim 1, wherein R is a tetrahydrofurfuryl group.

3. The polyetheramine of claim 2, wherein A is $NH_2$.

4. The polyetheramine of claim 1, wherein $R_1$ and $R_2$ are each independently hydrogen, methyl or ethyl and each $R_1$ and $R_2$ is independently selected in each —O—$CHR_1$—$CHR_2$— unit with the proviso that at least one of $R_1$ or $R_2$ is hydrogen; and m is an integer ranging from about 5 to about 100.

5. The polyetheramine of claim 1, wherein R is a $C_1$-$C_4$ alkyl-substituted tetrahydrofurfuryl group; $R_1$ and $R_2$ are each independently hydrogen, methyl or ethyl and each $R_1$ and $R_2$ is independently selected in each —O—$CHR_1$—$CHR_2$— unit with the proviso that at least one of $R_1$ or $R_2$ is hydrogen; A is $NH_2$; and m is an integer ranging from about 5 to about 100.

6. A process for producing the polyetheramine of claim 1 comprising charging a tetrahydrofurfuryl alcohol or alkyl substituted tetrahydrofurfuryl alcohol to an alkoxylation reaction zone, contacting the tetrahydrofurfuryl alcohol or alkyl substituted tetrahydrofurfuryl alcohol with an alkylene oxide in the alkoxylation reaction zone for a period of time to provide an intermediate polyol, charging the intermediate polyol to a reductive amination zone, and contacting the intermediate polyol in the reductive amination zone with a reductive amination catalyst in the presence of hydrogen and ammonia or a primary alkyl amine.

7. The process of claim 6, wherein the intermediate polyol is contacted with the reductive amination catalyst in the presence of hydrogen and ammonia.

8. A dispersant comprising the reaction product of a polyetheramine having a formula (I)

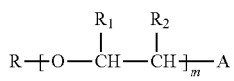

wherein R is a tetrahydrofurfuryl group or an alky-substituted tetrahydrofurfuryl group; $R_1$ and $R_2$ are each independently hydrogen, methyl or ethyl and each $R_1$ and $R_2$ is independently selected in each —O—$CHR_1$—$CHR_2$— unit; A is $NH_2$; and, m is an integer ranging from about 2 to about 200 and a copolymer comprised of polymerized units of an alkenyl aromatic monomer and an α,β-unsaturated carboxylic acid moiety.

9. The dispersant of claim 8, wherein the alkenyl aromatic monomer comprises styrene.

10. The dispersant of claim 8, wherein the α,β-unsaturated carboxylic acid moiety comprises maleic anhydride.

11. A process for producing the dispersant of claim 8 comprising reacting from about 0.001 mole to about 2 moles of the polyetheramine with 1 mole of the copolymer at a temperature ranging from about 50° C. to about 250° C.

12. The process of claim 11, wherein the copolymer is comprised of polymerized units of styrene and maleic anhydride.

13. A dispersant comprising the reaction product of a polyetheramine having a formula (I)

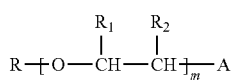

wherein R is a tetrahydrofurfuryl group or an alky-substituted tetrahydrofurfuryl group; $R_1$ and $R_2$ are each independently hydrogen, methyl or ethyl and each $R_1$ and $R_2$ is independently selected in each —O—$CHR_1$—$CHR_2$— unit; A is $NH_2$; and, m is an integer ranging from about 2 to about 200 and an epoxy resin.

14. The dispersant of claim 13, wherein the epoxy resin comprises a compound having the formula

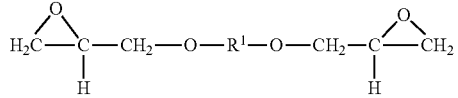

wherein $R^1$ is an alkyl group, an aryl group or an arylalkyl group.

15. A process for producing the dispersant of claim 13 comprising reacting the polyetheramine with the epoxy resin at an epoxy equivalent:amine equivalent ratio of between about 1.10:1 to about 5:1 and at a temperature ranging from about 20° C. to about 200° C.

16. A process for producing the dispersant of claim 13 comprising reacting the polyetheramine with the epoxy resin at a temperature ranging from about 20° C. to about 200° C. and wherein the polyetheramine is present in an amount that is stoichiometrically equal to or greater than the amount of epoxide in the epoxy resin.

17. An aqueous solution comprising the dispersant of claim 8, wherein the dispersant is soluble in the aqueous solution to a degree of at least 40% by weight of the dispersant.

18. An aqueous solution comprising the dispersant of claim 13, wherein the dispersant is soluble in the aqueous solution to a degree of at least 40% by weight of the dispersant.

19. An aqueous pigment dispersion comprising the dispersant of claim 8, a pigment and a solvent component.

20. An aqueous pigment dispersion comprising the dispersant of claim 13, a pigment and a solvent component.

* * * * *